(12) United States Patent
Meyers

(10) Patent No.: US 9,000,917 B1
(45) Date of Patent: Apr. 7, 2015

(54) METHOD AND APPARATUS FOR SMART ELECTRONIC SEALS

(75) Inventor: Richard C. Meyers, Longboat Key, FL (US)

(73) Assignee: GlobalTrak, LLC, Arlington, VA (US)

( * ) Notice: Subject to any disclaimer, the term of this patent is extended or adjusted under 35 U.S.C. 154(b) by 478 days.

(21) Appl. No.: 13/345,414

(22) Filed: Jan. 6, 2012

Related U.S. Application Data

(60) Provisional application No. 61/430,359, filed on Jan. 6, 2011.

(51) Int. Cl.
*G08B 13/00* (2006.01)
*G08B 26/00* (2006.01)

(52) U.S. Cl.
CPC .................................. *G08B 26/007* (2013.01)

(58) Field of Classification Search
USPC ...................................... 340/541, 539.31, 542
See application file for complete search history.

(56) References Cited

U.S. PATENT DOCUMENTS

| 7,564,352 | B2 * | 7/2009 | Ekstrom | 340/545.6 |
| 7,936,266 | B2 * | 5/2011 | Francis et al. | 340/545.1 |
| 8,279,067 | B2 * | 10/2012 | Berger et al. | 340/572.1 |
| 8,456,302 | B2 * | 6/2013 | Stevens | 340/539.31 |
| 2003/0102957 | A1 * | 6/2003 | Crisp | 340/5.2 |
| 2004/0108938 | A1 * | 6/2004 | Entrekin | 340/5.73 |
| 2006/0202824 | A1 * | 9/2006 | Carroll et al. | 340/568.1 |

* cited by examiner

*Primary Examiner* — Toan N Pham

(57) ABSTRACT

A system, apparatus, and method for a high degree of container security using tamper-evident electronic seals is provided. In a preferred embodiment, the tamper evident electronic seal is implemented as a smart E-seal monitoring device and includes a GPS transponder, a sensor manager, an expandable sensor suite, and other components. The smart E-seal may be snapped into place in the door jamb of an existing container. According to one aspect of the invention, the smart E-seal automatically disarms itself after entering a safe zone, and automatically arms itself when leaving a safe zone. More specifically, the smart E-seal may transmit messages to a remote monitoring station regarding the arming/disarming events and the sensor conditions.

16 Claims, 5 Drawing Sheets

METHOD AND APPARATUS FOR SMART ELECTRONIC SEALS

PRIORITY CLAIM

The present invention claims priority to U.S. Provisional Application No. 61/430,359, filed Jan. 6, 2011.

BACKGROUND AND FIELD OF THE PRESENT INVENTION

1. Field of the Present Invention

The present invention relates generally to container security and, more particularly, to a container security system in which tamper-evident electronic seals are capable of communication in a mobile Ad Hoc network to provide a high degree of confidence regarding the content and security of the container.

2. Background of the Invention

Containerized shipping is a critical component of international trade. About 90% of the world's trade is transported in cargo containers and almost half of incoming U.S. trade (by value) arrives by containers onboard ships. More than seven million cargo containers arrive on ships and are offloaded at U.S. seaports each year.

As terrorist organizations have increasingly turned to destroying economic infrastructure to make an impact on nations, the vulnerability of international shipping has come under scrutiny. Under the Container Security Initiative (CSI) launched in 2002 by the U.S. Bureau of Customs and Border Protection (CBP), the screening of containers that pose a risk for terrorism is accomplished by teams of CBP officials deployed to work in concert with their host nation counterparts.

The CSI consists of four core elements which include: using intelligence and automated information to identify and target containers that pose a risk for terrorism; pre-screening those containers that pose a risk at the port of departure before they arrive at U.S. ports; using detection technology to quickly pre-screen containers that pose a risk; and using smarter, tamper-evident containers.

As of Oct. 15, 2008, the SAFE Port Act requires that all containers entering the U.S. from foreign ports of origin (including those from non C-TPAT members) must be secured with a high-barrier security seal that conforms to strength values as specified in the ISO/DIS 17712 Standard. One hundred sixty-six member countries of the World Customs Organization (WCO) have signed "The Framework of Standards to Secure and Facilitate Global Trade." Such seal integrity programs will be based on the use of a high-security mechanical seal as presented in ISO 17712 at the point of stuffing. The CBP will consider the SAFE Port Act to be violated if non-compliant containers arrive at a port of entry in the United States on or after Oct. 15, 2008.

Generally, ISO/PAS 17712 requires that container freight seals meet or exceed certain standards for strength and durability so as to prevent accidental breakage, early deterioration (due to weather conditions, chemical action, etc.) or undetectable tampering under normal usage. ISO/PAS 17712 also requires that each seal be clearly and legibly marked with a unique identification number.

DESCRIPTION OF RELATED ART

As is well known in the prior art, E-seals are typically either active or passive. A passive seal relies on a signal from the reader to activate the E-seal from a period of inactivity and electronically prompts the unit to transmit its information. This information can include the E-seal identification number; time and date when the seal was affixed; whether the seal has been tampered with; and the time of any event that occurred since the seal was activated. These E-seals tend to be short-range and directional because they rely on the power from readers. Because a passive E-seal does not require a constant power source, it can usually be operated for an extended period of time with batteries. The batteries power the signal transmission when the seal is interrogated by a reader. They also keep an internal clock running, run internal checks, and log any events. E-seals powered by batteries can have a signal range of up to 30 meters.

Active E-seals have the same capabilities as passive seals, but they can also initiate transmissions. The advantages of using this kind of seal include a much greater range of up to 100 meters and a much stronger signal, which allows the signal to be transmitted around and beyond minor obstructions. Active E-seals cost more because of their enhanced capabilities and the number of batteries needed to power them. These seals also have greater maintenance costs because of the requirement to more frequently replace the batteries.

Several different examples of patented electronic seals available today are: the GlobalTrak E-seal combining a covert Assist GPS tracking and sensing device; the Hercules E-seal which is ISO 17712 compliant for cross border use; the Hyperion E-seal which is for domestic use only; and the Hercules Padlock E-seal which combines a padlock to the electronic seal for multiple uses domestically.

While Electronic door seals (E-seals) have proven to improve supply chain efficiency and security, there are some major obstacles to their expanded use in global trade. More specifically, E-seals remain impractical for shippers and enforcement officials in their present state because they still require global standardization and infrastructure to be used world-wide. Still further, disposable E-seals, which would decrease industry concerns about costs and enforcement agency concerns about security, are not common because they need to be manufactured in large quantities to be cost effective. For these reasons, the E-seal benefits at present do not outweigh the high cost of changing the industry standard.

SUMMARY OF THE PRESENT INVENTION

To address the problems and limitations noted above, the present invention provides a tamper-evident smart E-seal capable of communicating with other E-seals, readers, and remote monitoring bases. This provides an automated E-seal data entry process with wireless data transfer protocol.

The smart electronic seal of the present invention is a container security device that may be snapped into place in the door jamb of an existing container without any special tools. After loading, the shipper accesses the system, logs in an access code, registers the container number and authorizes sealing the container. The system generates an entry that gives the time, date, and seal number. Afterwards, the container's security device can be queried by anyone with access to the system. The container security device transmits information to a receiver or "reader." The reader may preferably be attached to any cell phone with global capability. In response, the device will generate a "data log" that records every time the device has been electronically queried and each time the door has been opened and resealed. A checking device or "checker," which does not require a cell phone, can also be used to check the seal's status. The "checker" indicates only whether the container has been opened and provides an indicator as to the status of the container. Non-portable hardwired readers are also placed at port cargo gateways to monitor the security devices. At its destination or any intermediate point, an authorized person can key in an access number and open the container. If a container has been tampered with, it will be referred for inspection.

Preferably the smart electronic seal of the present invention will function as a mobile Ad Hoc network (MANET), which may be a self-configuring network of mobile devices connected by wireless links. Each E-seal in a MANET may be free to move independently in any direction, and change its links to other devices frequently. Each may forward traffic unrelated to its own use, and therefore be a router. A smart E-seal network may operate by itself or may be connected to the larger Internet.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Figure 1:
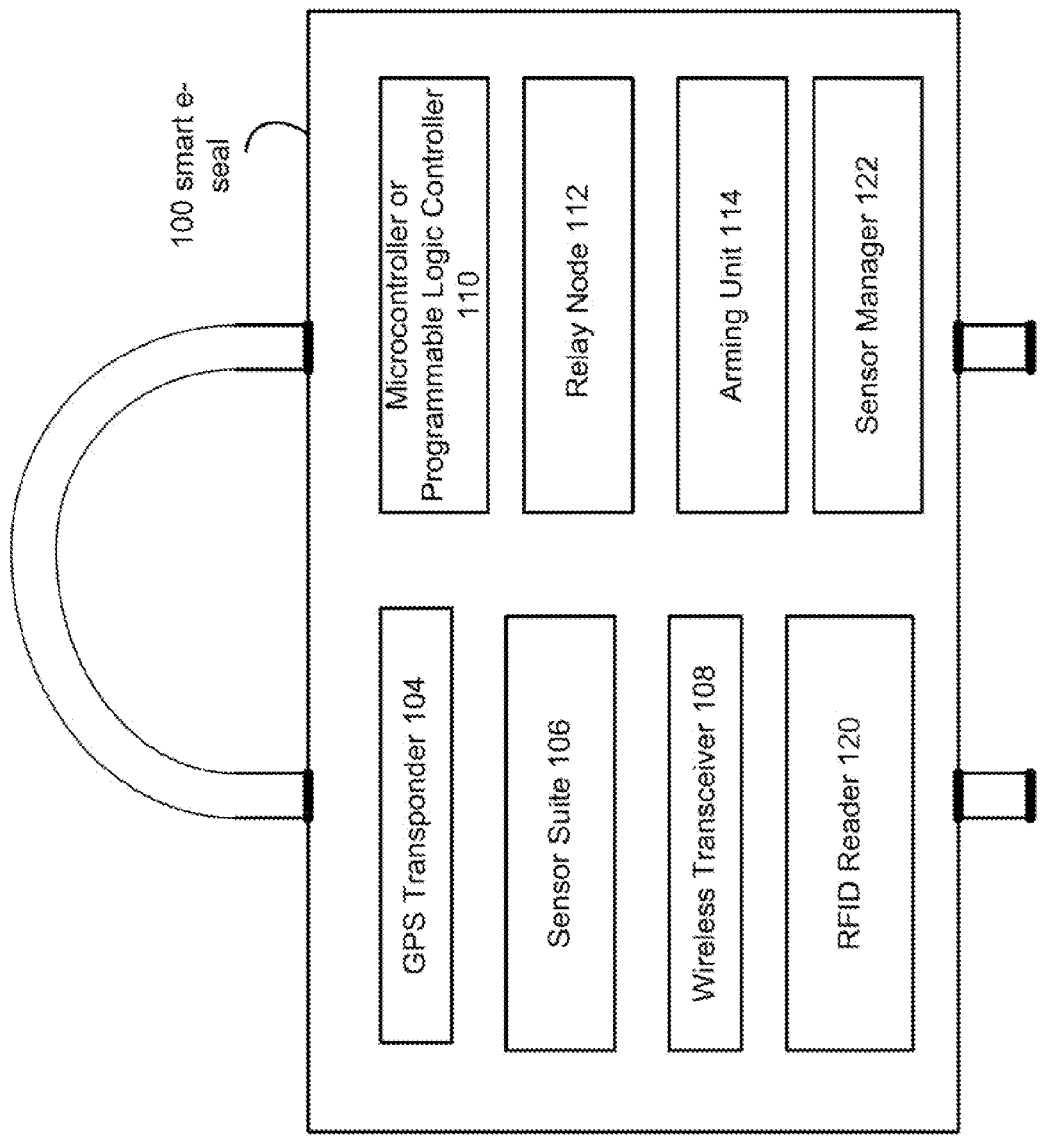
FIG. 1 is a block diagram of an example of a smart E-seal monitoring device in accordance with an embodiment of the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

The terms "program," "computer program," "software application," and the like as used herein, are defined as a sequence of instructions designed for execution on a computer system. A program, computer program, or software application may include a subroutine, a function, a procedure, an object implementation, an executable application, an applet, a servlet, a source code, an object code, a shared library, a dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such a RAM, buffers, cache memory, and network circuits are contemplated to serve as such data storage means according to different embodiments of the present invention.

With reference now to FIG. 1, a block diagram of an example of a smart E-seal monitoring device in accordance with an embodiment of the present invention will now be discussed. As shown in FIG. 1, a smart E-seal monitoring device 100 according to a preferred embodiment of the present invention preferably includes: a GPS Transponder 104; an expandable sensor suite 106; a wireless transceiver 108; a Programmable Logic Controller (PLC) 110; a relay node 112; an alarming unit 114; an RFID reader 120; and a Sensor Manager 122.

As shown in FIG. 1, in one preferred embodiment, the smart E-seal includes a reusable seal body and a disposable seal strap. The smart E-seal may be activated by the insertion of the strap. In another preferred embodiment, the smart E-seal includes a reusable seal body and a disposable bolt and a disposable lock cap. Alternatively, a padlock version of lock cap with a reusable bolt may be used together with the reusable seal body. The smart E-seal may be activated by the insertion of the bolt. In a standard E-seal tracking mode, the E-seal may be applied externally to physically lock the container door. Preferably, any cut, removal of the strap/bolt, or other types of tampering of the E-seal is immediately detected. In an alternative embodiment, the E-seal may also be used as an embedded tracking device by using a dummy bolt to activate the unit.

The smart E-seal may be powered by a non-rechargeable battery or rechargeable battery. Each E-seal preferably contains a unique ID number. The smart E-seal may be read using a RFID reader. In more advanced embodiment, the smart E-seal may be capable of communicating with other devices such as the smart container monitoring unit via a ZigBee wireless network. The smart E-seal may further transmit reports to a monitoring station via a cellular network or store the reports when a network is not available. Furthermore, the smart E-seal may utilize 2-way cellular communication to determine the approximate location of the device when GPS is not available.

E Seal MANET Communications in Geo-Zone

Figure 2:
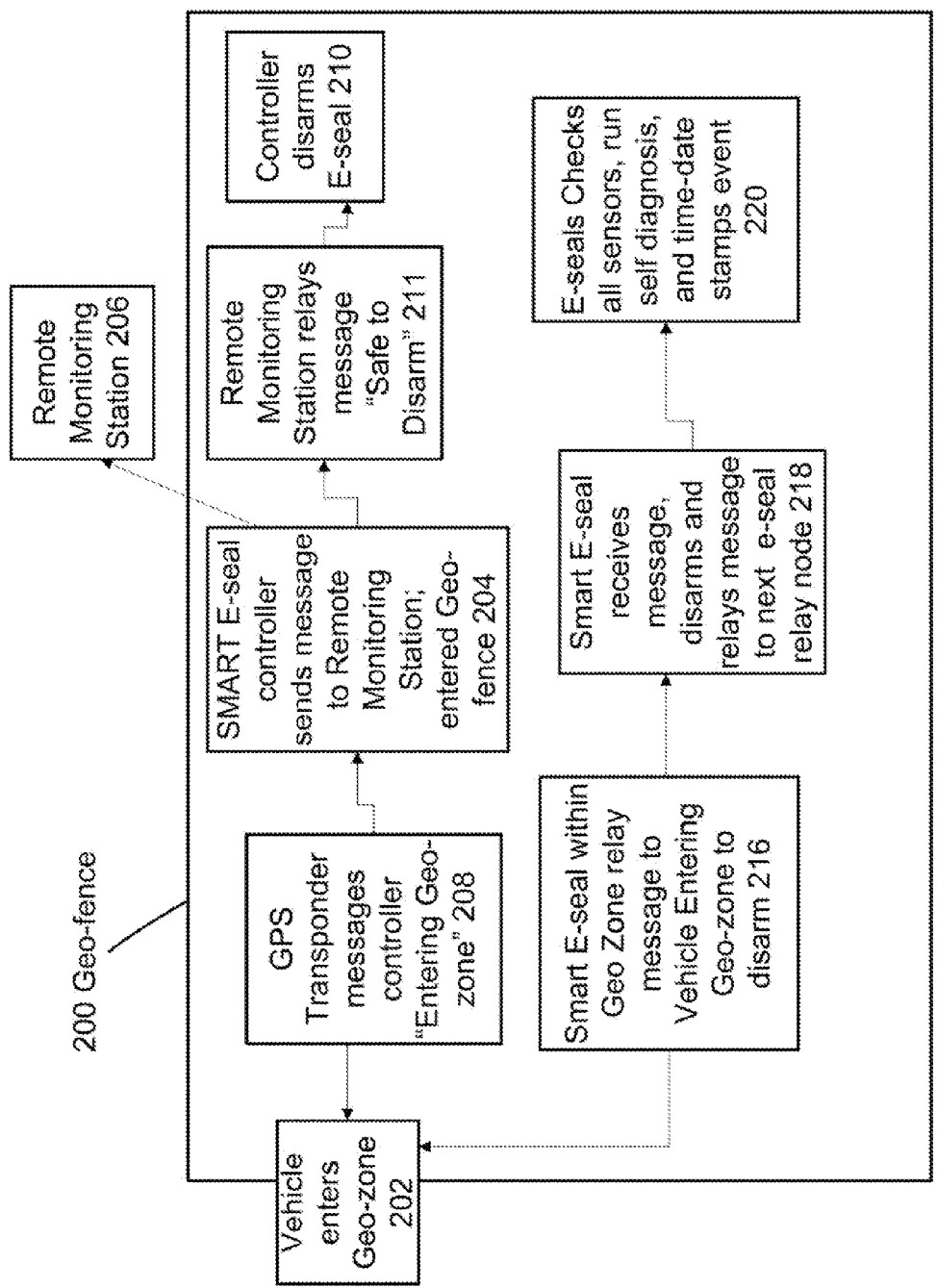
FIG. 2 shows a block diagram of a method of automatic arming and disarming E-seals within a Geo-zone in accordance with an embodiment of the present invention.

With reference now to FIG. 2, a block diagram of a method of automatic arming and disarming E-seals within a Geo-zone in accordance with an embodiment of the present invention will now be discussed. A primary function of the method of the present invention is to automatically disarm E-seals as they enter an established Geo-zone, for example, at a specific warehouse. This automatic disarming upon entering the Geo-zone can be managed via the E-seal Mesh Network or via a GPS transponder which identifies when the E-seal has crossed a Geo-zone boundary. The purpose of such function is to decrease labor hours within a safe-zone when unloading cargo containers. As shown in FIG. 2, upon entering the Geo-zone 202, the GPS Transponder preferably messages the controller that it is "entering Geo-zOne" 208, the smart E-seal controller then may send a message to the Remote Monitoring Station 206 that is entering the Geo-zone. The Remote Monitoring Station 206 may then transmit a message that it is "safe to disarm" 211 and this prompts the controller to send a disarming message to the E-seal 210.

As further shown in FIG. 2, disarming messages may also be sent via a Mobile Ad Hoc Network from an E-seal relay node to an E-seal within a vehicle entering a Geo-zone 216. If an E-seal receiving a message to disarm has been previously disarmed, then the E-seal will remain disarmed and may also relay the message to the nearest E-seals in Geo-zone vicinity 218. The communication from one E-seal relayed to another will trigger automatic disarming of E-seals. When the message reaches an E-seal within the MANET, the message will automatically trigger the E-seal to disarm 218 in the safe zone saving man hours during the unloading process. After disarming, an E-seal may check all sensors, run self-diagnosis, and time-date stamp disarming event 220.

Figure 3:
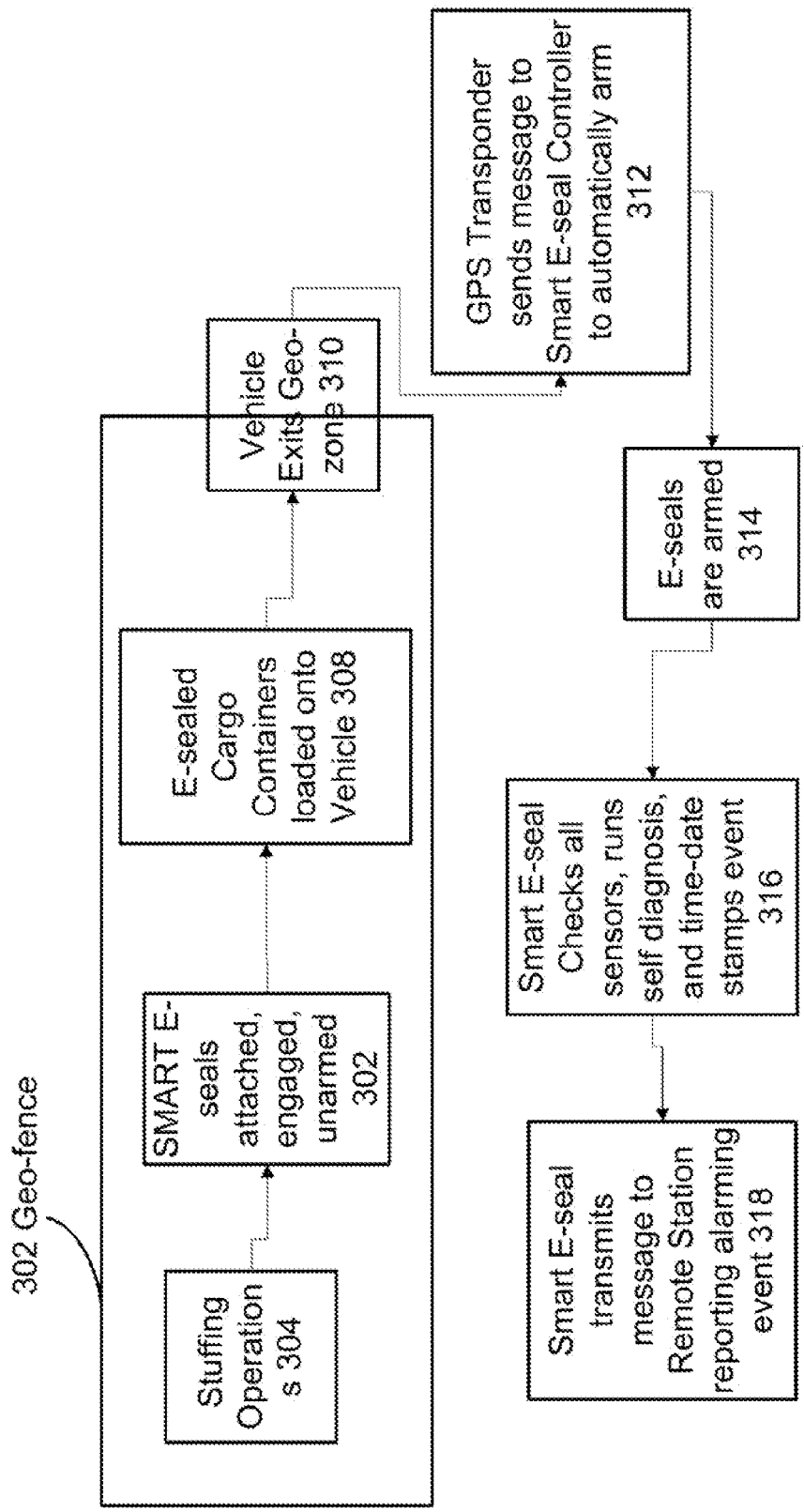
FIG. 3 shows a block diagram describing automatic arming of E-seals when exiting a Geo-zone, in accordance with an embodiment of the present invention.

With reference now to FIG. 3, a block diagram describing automatic arming of E-seals when exiting a Geo-zone, in accordance with an embodiment of the present invention will now be discussed. As shown in FIG. 3, preferably, F-seals are secured to cargo containers following stuffing operations 304. If stuffing occurs within a safe zone or Geo-zone 302, then the E-seals will preferably remain fully engaged but disarmed 302 while cargo containers are loaded onto vehicles 308. When the vehicle exits Geo-zone 310, the GPS transponder of the E-seal preferably sends a message to the E-seal controller that the Geo-zone has been exited 312 and controller may automatically arm the E-seals 314. Once armed, the smart E-seal controller will check all sensors, run self-diagnosis, and time-date stamp the arming event 316. Finally, the controller may transmit a message to the Remote Monitoring Station that the E-seal has been armed 318. This automatic arming feature acts as an efficient method of ensuring all E-seals are armed once a Geo-zone is exited and it saves countless labor hours to arm each E-seal separately.

Figure 4:
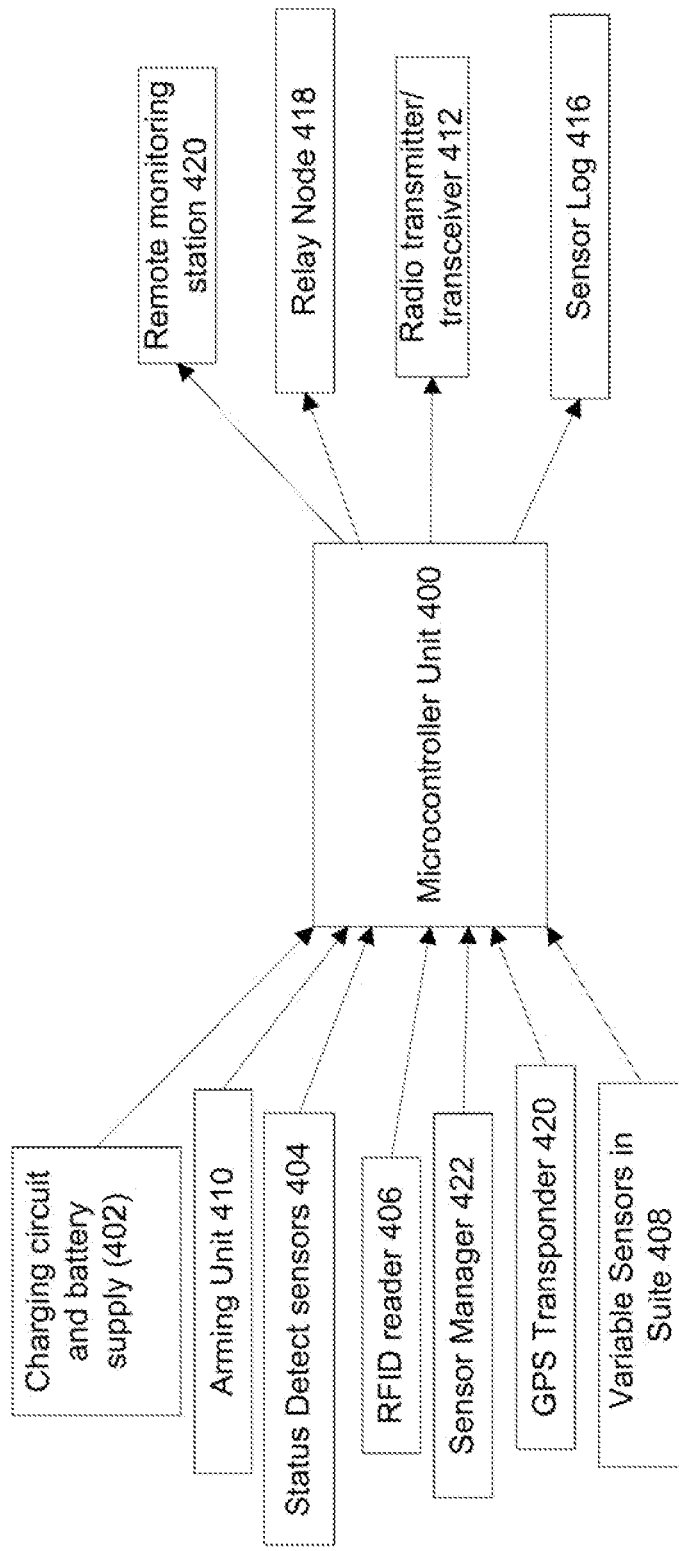
FIG. 4 shows a block diagram of the electrical wiring in accordance with an embodiment of the present invention.

With reference now to FIG. 4, a block diagram of the electrical wiring in accordance with an embodiment of the present invention will now be discussed. A microcontroller unit 400 receives input from a charging circuit and battery cells 402, status detect sensors 404, an RFID reader 406, variable sensors in suite 408, arming unit 410, sensor manager 422, and a GPS Transponder 420. The microcontroller unit 400 then assesses all the information and sends out signals to a radio transmitter/transceiver 412, a sensor log 416, a relay node 418 and a remote monitoring station 420. Data from these sensors is processed, stored, and acted upon by the microcontroller unit 400.

Preferably, the sensor unit of the present invention includes circuitry and digital ports to connect to existing electrical and sensor management systems of trailers and containers previously configured with embedded circuitry. In operation, a microcontroller unit 400 is preferably programmed to routinely scan the condition of each sensor to ensure operability.

Figure 5:
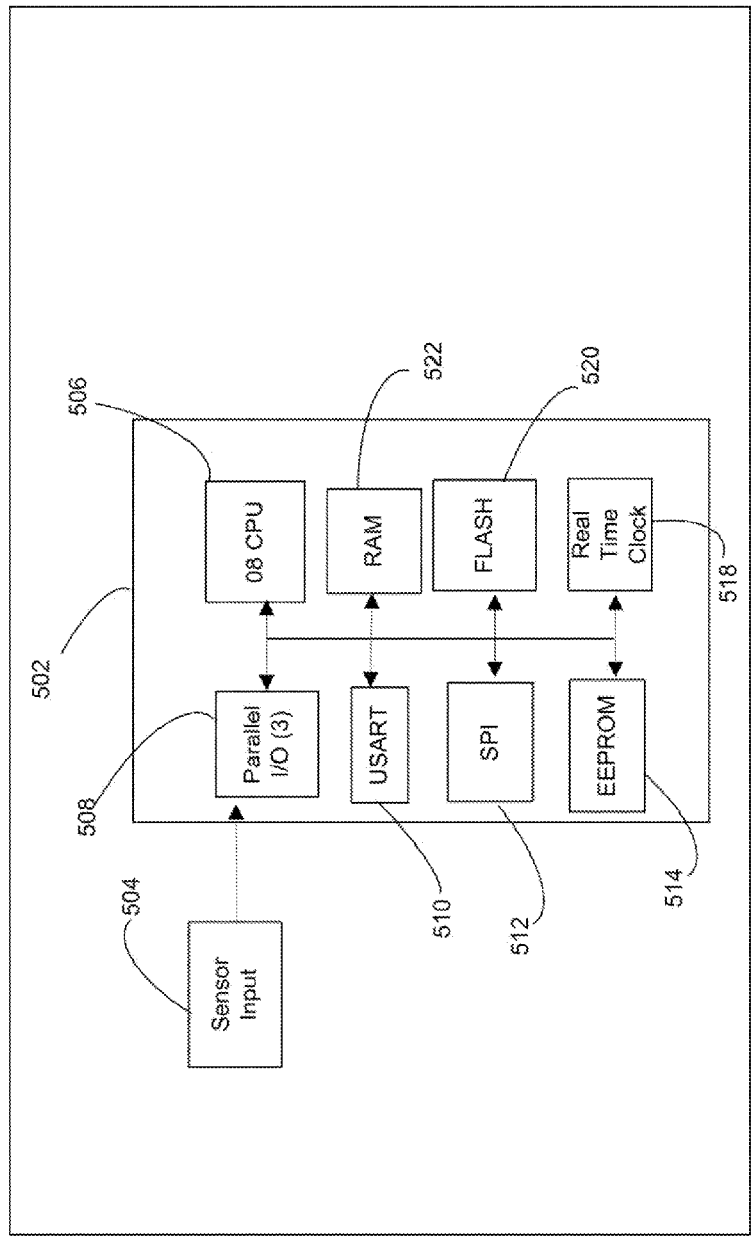
FIG. 5 is a block diagram of a sensor control unit according to an embodiment of the present invention.

With reference now to FIG. 5, it is preferred that the microcontroller unit 502 receives data from the sensor suite 304 and incorporates a microprocessor 506, a real time clock 518, a general purpose Input/Output port to support external peripheral control 508, a Universal Synchronous/Asynchronous Receiver Transmitter (USART) 510, a Serial Port interface (SPI) 512, and memory such as RAM 522, FLASH memory 520, and EEPROM 514 as shown.

Communication System

In accordance with a preferred embodiment of the present invention, the reporting may be made via a wireless connection to a satellite mode to communicate with a satellite system such as Globalstar™ or Orbcomm™. Preferably, such a satellite device will be a device such as the Axxon™, AutoTracker™, or the like, or a customized Orbcomm™ VHF satellite GPS tracking communications device which may be adapted with Zigbee™ interface antenna devices to incorporate them into the overall LAN architecture of the security system; these devices include a satellite transceiver, GPS receiver, a customized Zigbee™ wireless antenna with a serial (Ax Tracker™) or duplex (OrbComm™) interface.

In accordance with an alternative preferred embodiment of the present invention, the reporting may also be made using a wireless system independent from the satellite system. According to this embodiment, wireless signals may be transmitted to a wireless relay, base station or the like for routing and transmission to a chosen centralized location independent from or in combination with the transmissions made from the satellite system. In accordance with this alternative embodiment, signals may also be received by the communications manager and wireless interface from such external wireless networks as well.

According to a preferred embodiment of the present invention, it is preferred that the wireless communications used within the present invention will be based on the Zigbee™ (IEEE 802.15.4) standard. This standard transmits RF signals in the 2.4 GHz ISM band and operates with low power consumption due to its relatively slower data transmission rate (128 Kpps-250 Kbps). This approach enables additional capacity and flexibility of design through an up to 255 node pico-network. Communications are simplex or duplex in design, meaning that data can be assessed in either a push or pull process.

As referred to above, all communications of the present invention may be designed to be duplex or simplex in nature. Further, as needs require, the processes for transmitting data to and from the present invention may be designed to be push or pull in nature. Still, further, each feature of the present invention may be made to be remotely activated and accessed from distant monitoring stations. Accordingly, data may preferably be uploaded to and downloaded from present invention as needed. For example, as detailed above, each system and subsystem of the present invention may be designed to send, receive, report and request information via the wireless and/or satellite systems so as to continually maintain and update the container systems.

Additional communications with the communications manager are preferably enabled via industry standard wired interfaces, with communications protocols implemented in firmware for future upgrade. These interfaces preferably will include at least two RS-322 compatible serial ports. These alternate serial ports may assist the communications manager to interface with additional remote sensors as well as other local reader/controllers such as an RFID reader or other devices.

Remote Monitoring

To support and monitor the dataflow generated by the present invention, it is preferred that users establish a centralized location to collect and analyze data. This central location or "data fusion center" would preferably consolidate all tracking signals, sensor alarms and reports generated by the monitoring systems and provide further context and links with current intelligence.

Preferably, such a data fusion center will receive such source information in a variety of formats such as Electronic Data Interchange, XML, E-mail, HTML and flat text files. After receiving such data, the data fusion center preferably would act to process information to identify anomalies. With this data collected and processed, analyst may calculate statistics and probability of detection models used for decision support. In short, such a data fusion center would preferably provide a consolidated source of information that could be used to assist agencies and shippers.

What is claimed is:

1. A tamper-evident electronic seal apparatus for providing a high degree of container security, the apparatus comprising:
   a data recording element, wherein the data recording element is configured to record data regarding selected events;
   an access control element, wherein the access control element is configured to monitor and allow access to the container;

a plurality of electronic seal devices which are configured to determine when a seal is broken, wherein the electronic seal devices are comprised of a detector switch; a transceiver and a communication control element; further wherein, at least one or more electronic seal devices are capable of communicating with other electronic seal devices; further wherein, at least one electronic seal device includes a visible signaling element which can provide a visible alert regarding a status of the container; and further wherein, at least one electronic seal device is configured to transmit an alert to a second electronic seal device which is capable of displaying a visible alert regarding the status of the container.

2. The apparatus of claim 1, wherein the apparatus further comprises:
   a GPS unit;
   a sensor suite; and
   a sensor manager.

3. The apparatus of claim 2, wherein the access control element is configured to automatically disarm the electronic seal element based on location data determined by the GPS unit.

4. The apparatus of claim 3, wherein the access control element is configured to automatically disarm the electronic seal element based on location data determined via a Mobile Ad Hoc Network.

5. The apparatus of claim 3, wherein the access control element is configured to automatically arm the electronic seal element based on location data determined by the GPS unit.

6. The apparatus of claim 3, wherein the access control element is located within the electronic seal element.

7. The apparatus of claim 1, wherein the access control element is configured to automatically disarm the electronic seal element based on instructions received from a remote monitoring station.

8. The apparatus of claim 1, wherein the access control element is configured to collect and provide data regarding whether the container has been opened after being sealed.

9. A tamper-evident electronic seal apparatus for providing a high degree of container security, the apparatus comprising: a plurality of electronic seal devices which are configured to determine when a seal is broken, wherein the electronic seal devices are comprised of: a detector switch; a transceiver and a communication control element; further wherein, at least one or more electronic seal devices are capable of communicating with other electronic seal devices; further wherein, at least one electronic seal device includes a visible signaling element which can provide a visible alert regarding a status of the container; and further wherein, at least one electronic seal device is configured to transmit an alert to a second electronic seal device which is capable of displaying a visible alert regarding the status of the container.

10. A method for providing a high degree of container security in a system using a plurality of electronic seal devices which are configured to determine when a seal is broken, wherein one or more electronic seal devices are comprised of a detector switch, a transceiver and a communication control element, the method comprising:
   (a) registering an access code and a container number;
   (b) activating an electronic seal function;
   (c) determining when a seal is broken;
   (d) transmitting notice of a security breach in a first sealed container to a seal device of a second container; and
   (e) signaling an alarm in the second container based on the security breach in the first container.

11. The method of claim 10, wherein the method further comprises:
   automatically disarming the electronic seal function when the electronic seal device determines that its current location is within a safe zone.

12. The method of claim 11, wherein the method further comprises:
   sending a message to a remote monitoring station after determining the current location is in a safe zone;
   receiving a safe to disarm message from the remote monitoring station;
   disarming the electronic seal function; and
   logging the disarming event.

13. The method of claim 10, wherein the method further comprises:
   identifying whether the current location of at least one electronic seal device is in the safe zone via a GPS unit integrated within at least one electronic seal device.

14. The method of claim 10, wherein the method further comprises:
   identifying whether the current location of at least one electronic seal device is within a safe zone via data from a Mobile Ad Hoc Network.

15. The method of claim 10, wherein the method further comprises:
   automatically arming the electronic seal function when the electronic seal device determines a current location is not in a safe zone.

16. A tamper-evident electronic seal apparatus for providing a high degree of container security, the apparatus comprising:
   an electronic seal devices which is configured to determine when a seal is broken, wherein the electronic seal device is comprised of: a detector switch; a transceiver and a communication control element; further wherein, the electronic seal device is capable of communicating with other electronic seal devices; further wherein, the electronic seal device includes a visible signaling element which can provide a visible alert regarding the status of the container; and further wherein, the electronic seal device is configured to transmit an alert to a second electronic seal device which is capable of displaying a visible alert regarding the status of the container.

* * * * *